United States Patent [19]

Iio

[11] Patent Number: 4,886,392

[45] Date of Patent: Dec. 12, 1989

[54] PRESS-FIT STRUCTURE OF A SHAFT

[75] Inventor: Masahiro Iio, Saitama, Japan

[73] Assignee: Diesel Kiki Co., Ltd., Tokyo, Japan

[21] Appl. No.: 93,004

[22] Filed: Sep. 4, 1987

[30] Foreign Application Priority Data

Sep. 30, 1986 [JP] Japan .................... 61-150599[U]

[51] Int. Cl.⁴ .................................... F16B 11/00
[52] U.S. Cl. ..................... 403/282; 403/345; 29/525
[58] Field of Search ........... 403/282, 345, 273, 359, 403/360, 242, 298, 334; 29/525

[56] References Cited

U.S. PATENT DOCUMENTS

| 3,520,565 | 7/1970 | Fowler | 403/334 |
|---|---|---|---|
| 4,226,454 | 10/1980 | Tranberg et al. | 403/282 X |
| 4,269,550 | 5/1981 | DiGiulio | 29/525 X |
| 4,321,987 | 3/1982 | Dressell, Jr. et al. | 403/282 X |
| 4,416,564 | 11/1983 | Billet et al. | 403/282 |
| 4,488,738 | 12/1984 | Valdes | 29/525 X |
| 4,509,381 | 4/1985 | Ikemoto et al. | 403/282 X |
| 4,576,325 | 3/1986 | Maurice | 29/525 X |
| 4,595,349 | 6/1986 | Preston et al. | 29/525 X |
| 4,630,498 | 12/1986 | Santi | 403/282 X |
| 4,640,641 | 2/1987 | Edelmayer | 403/282 X |
| 4,741,091 | 5/1988 | Settles | 403/282 X |

FOREIGN PATENT DOCUMENTS 59-68586 4/1984 Japan .

Primary Examiner—Randolph A. Reese
Assistant Examiner—Peter M. Cuomo
Attorney, Agent, or Firm—Wenderoth, Lind & Ponack

[57] ABSTRACT

A press-fit structure of a shaft comprising a shaft and a member to be fitted with the shaft formed with a shaft hole for receiving the shaft therein, the shaft being formed at a predetermined position of the peripheral surface thereof with a meshing shaft portion which is formed with a plurality of meshing projections in the axial direction, the shaft hole being formed in an inner peripheral surface thereof with an annular groove for collecting a press-fit fin of cut material.

3 Claims, 3 Drawing Sheets

PRESS-FIT STRUCTURE OF A SHAFT

BACKGROUND OF THE INVENTION

1. Field of the Invention

This invention relates to a press-fit structure of a shaft which is suitably used for a press fit of, for example, a rotor and a shaft of a cooling medium compressor of an automotive vehicle air conditioner, and which is constructed as such that a press-fit crack can be prevented from occurring and a torque can be surely transmitted.

2. Description of the Prior Art

For example, a rotor of a cooling medium compressor which is installed in an air conditioner of an automotive vehicle and a shaft for securing the rotor, are, in general, integrally fitted together by means of press-fit. In recent times, lightness of a cooling medium compressor is pointed out as one way for improving a fuel consumption of an automotive vehicle, and there appears a cooling medium compressor, in which the rotor is made of a light weight material such as aluminum alloy and the shaft is made of a steel material.

However, in a press-fit structure including a shaft and a rotor which are made of such materials as mentioned, since a thermal expansion coefficient of the rotor member is larger than that of the shaft member, a slippage is occurred in the press-fitting portions during a driving of the cooling medium compressor and a sure transmission of a torque is often disturbed.

In order to overcome the above-mentioned trouble, it is thinkable that, for example, a press-fit width is made wide or a press-fit length is made long. In that case, however, the rotor is likely to break at the press-fitted portion and therefore, this solution is unemployable.

A known art for solving the above problem is disclosed, for example, in Japanese Patent Eraly Laid-open Publication No. 59(1984)-68586. More specifically, this publication teaches a process for manufacturing a cooling medium compressor comprising pressurizing a side surface of a rotor made of an aluminum alloy in the axial direction, inserting a rotor material corresponding to a recess formed in the rotor by means of the pressure into a roulette groove formed in the peripheral surface of a shaft made of an iron-contained material, and securing both of them together, thereby to press fit the shaft into a shaft hole of the rotor.

However, in this conventional manufacturing process, since the shaft of the roulette groove is annularly formed in the circumferential direction of the shaft, a critical value of slippage is low with respect to a shaft torque and therefore, an anxiety towards an occurrence of slippage of the shaft cannot be wiped out. Moreover, since the so-called plastic fluid method is used in the above-mentioned process, a pressing machine having a large capability, etc. are required, which results in a large sized apparatus. Moreover, since the rotor material is limited to a soft material, a wear-resistance is poor. Thus, this process is difficult to be put into actual practice.

SUMMARY OF THE INVENTION

It is therefore an object of the present invention to provide a press-fit structure of a shaft, in which the above-mentioned problems inherent in the prior art is solved, the construction is simple, and yet a reliability of press-fit and quality thereof are much improved.

Another object of the present invention is to provide a press-fit structure of a shaft, in which a plurality of meshing projections are provided on a peripheral surface of a shaft to tighten the engagement between the shaft and a member to be fitted with the shaft and to increase a critical value of slippage of the shaft, thereby to surely transmit a torque from the shaft to the member.

A further object of the present invention is to provide a press-fit structure of a shaft, in which a member to be fitted with a shaft is provided in an inner peripheral surface of a shaft hole thereof with an annular groove for allowing a press-fit fin to be accommodated therein so that the fin is prevented from entering into the member to be fitted with the shaft, thereby to prevent a press-fit crack caused by an increase of a press-fit width.

A still further object of the present invention is to provide a press-fit structure of a shaft which is suitably used for fitting a rotor and a rotor shaft of a cooling medium compressor together.

A press-fit structure of a shaft according to the present invention is characterized in that a plurality of meshing projections are provided in a peripheral surface of a shaft in the axial direction, and a member to be fitted with the shaft is formed in an inner peripheral surface of a shaft hole thereof with an annular groove.

The above-mentioned objects, features, and advantages of the present invention will become more apparent from the following detailed description with reference to the accompanying drawings.

DETAILED DESCRIPTION OF THE PREFERRED EMBODIMENTS

Figure 1:
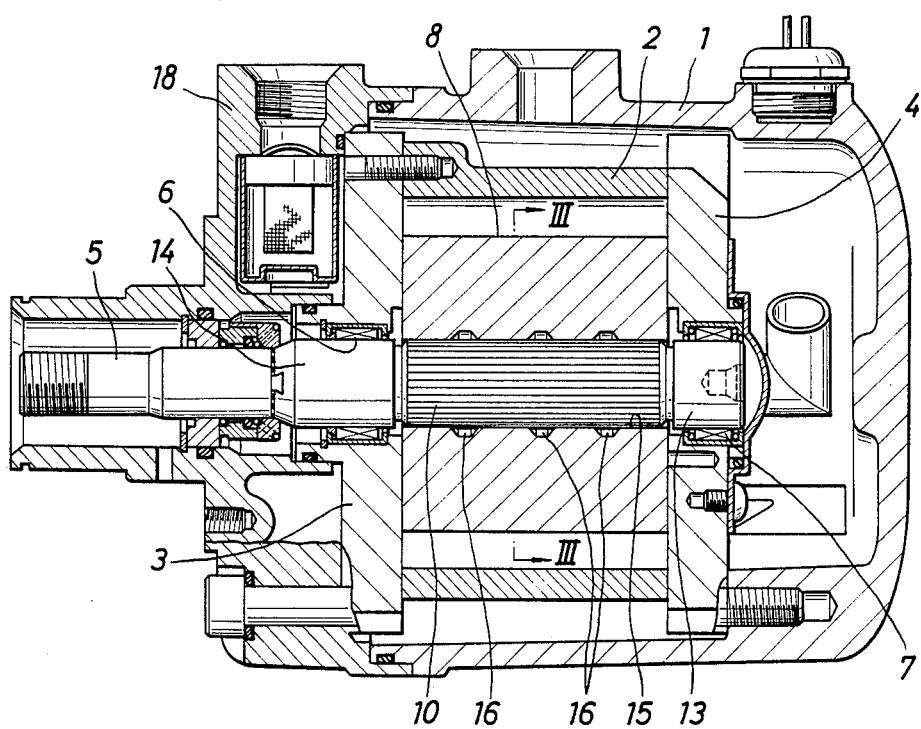
FIG. 1 is a sectional view of a cooling medium compressor to which the present invention is applied.
Figure 2:
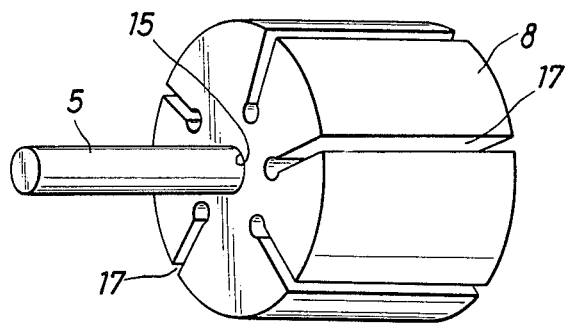
FIG. 2 is a perspective view of a shaft and a rotor which are used in a cooling medium compressor to which the present invention is applied.

An illustrated embodiment of the present invention will be described hereunder, in which the present invention is applied to a vane rotary type cooling medium compressor. Reference numeral 1 denotes a casing, within which a cylinder block 2 is accommodated. The block 2 is provided with a front side block 3 mounted on a front side thereof and a rear side block 4 mounted on a rear side thereof. Both the side blocks 3 and 4 are provided with bearings 6 and 7 by which a shaft 5 is rotatably carried. A rotor 8 acting as a member to be fitted with the shaft 5 is secured to the shaft 5.

Figure 3:
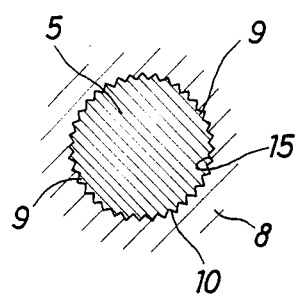
FIG. 3 is a sectional view, partly omitted, taken along line III—III of FIG. 1.

The shaft 5 is made of an iron-containing material such as a carbon steel, etc. A peripheral surface of a press-fit portion of the shaft 5, as shown in FIG. 3, is formed with a plurality of meshing projections 9 having a similar sectional configuration to a low tooth involute serration in the axial direction. A meshing shaft portion 10 having the projections 9, as shown in FIG. 1, is generally as long as the longitudinal length of the shaft portion 8. The shaft portion 10 is provided with a cut-groove on groove 11 in one end thereof and a cut-groove or groove 12 in the other end thereof. Straight body shaft portions 13 and 14 are disposed adjacent to the cut-grooves 11 and 12.

The straight body shaft portions 13 and 14 have a diameter generally similar to an outer diameter of the meshing shaft portion 10. The portions 13 and 14 each has a plain surface. These shaft portions 13, 14, and 10 are continuously gradually tapered, for example, with the shaft portion 13 having a small diameter and the shaft portion 14 having a large diameter.

On the other hand, the rotor 8 is made of a comparatively soft material such as an aluminum alloy, etc., and is provided with a shaft hole 15 having a slightly smaller diameter than the outer diameter of the meshing shaft portion 10, the shaft hole 15 penetrating the central portion of the rotor 8 in the axial direction. The shaft hole 15 is formed in a suitable place on the inner peripheral surface thereof with a plurality of annular grooves 16 having an equal width with respect to one another and adapted for collecting the press-fit fins.

In the figure, 17 denotes sliding grooves of a vane (not shown) which is opened up at the peripheral surface of the rotor 8, and 18 denotes a side housing secured to one end of the casing 1.

Figure 5:
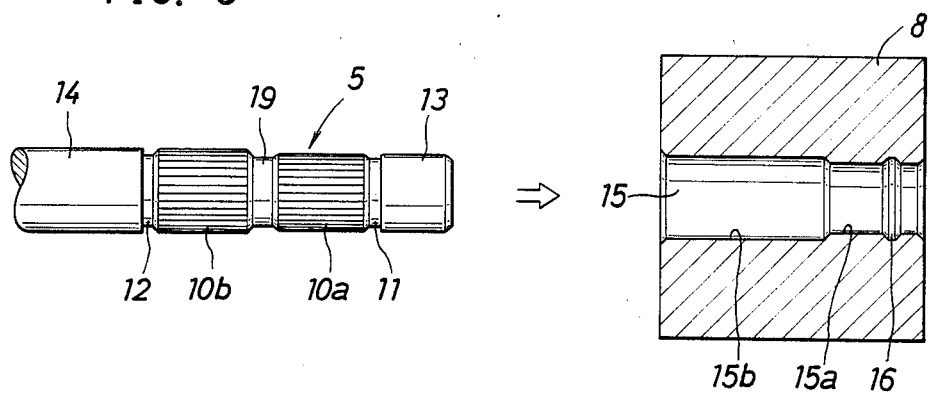
FIGS. 5 through 7 are front views of a shaft and sectional views of a member to be fitted with the shaft according to second through fourth embodiments of the present invention.
Figure 6:
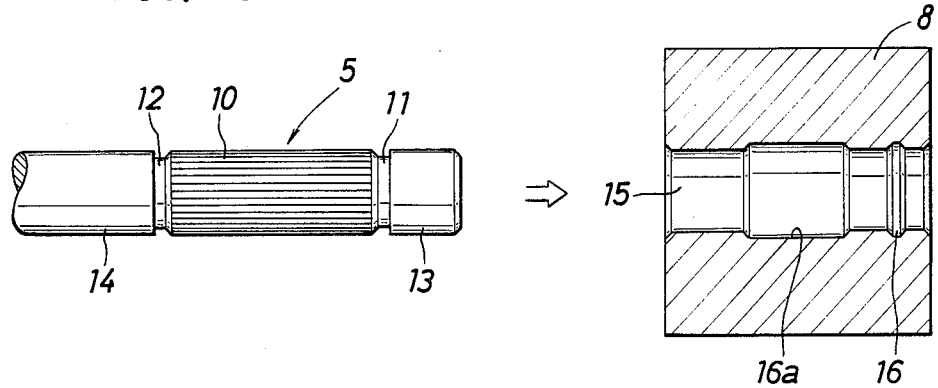
Figure 7:
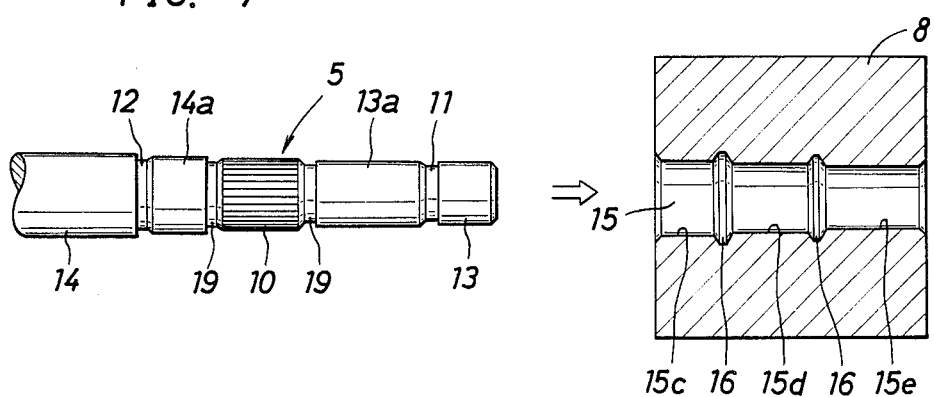

FIGS. 5 through 7 illustrate other embodiments of the present invention, wherein component parts corresponding to those of the above-mentioned embodiment are denoted by identical reference numerals. In a second embodiment of the present invention shown in FIG. 5, the meshing shaft portion 10 comprises two meshing shaft portions 10a and 10b instead of one. The meshing shaft portions 10a and 10b are spaced apart through a cut groove 19. The meshing shaft portions 10a and 10b have a different outer diameter with respect to each other. For example, the outer diameter of the meshing shaft portion 10a is smaller than that of the other meshing shaft portion 10b.

On the other hand, a shaft hole 15 of a rotor 8 is provided with shaft holes 15a and 15b having a different diameters corresponding to the meshing shaft portions 10a and 10b. By press fitting and securing the meshing shaft portions 10a and 10b to the corresponding shaft holes 15a and 15b, the fitting of the meshing projections 9 are tightened and slippage of the shaft 5 is effectively prevented.

In a third embodiment shown in FIG. 6, a shaft 5 is constructed generally in the same manner as the first embodiment. The third embodiment is characterized in that a shaft hole 15 of a rotor 8 is formed in an intermediate portion thereof with a wide annular groove 16a. By reducing the number of the annular grooves 16 and 16a, ease of manufacturing is obtained. In this embodiment, therefore, a meshing projection 9 of a meshing shaft portion 10 positioned at the annular groove 16a may be omitted.

In a fourth embodiment shown in FIG. 7, a shaft 5 is formed in an intermediate portion thereof with a comparatively short and small meshing shaft portion 10. The shaft portion 10 is provided at one end thereof with a straight body shaft portion 13a and at the other end thereof with another straight body shaft portion 14a through cut-grooves 19, 19, the straight body shaft portions 13a and 14a having a different diameter with respect to each other. Of them, the outer diameter of the shaft portion 13a is smaller than that of the shaft portion 10, whereas the outer diameter of the shaft portion 14a is larger than that of the shaft portion 10. In this embodiment, the shaft length of the shaft portion 13a is longer than that of the shaft portion 10, whereas the shaft length of the shaft portion 14a is smaller than that of the shaft portion 10.

On the other hand, the shaft hole 15 of the rotor 8 is formed with shaft holes or sections 15c, 15d and 15e having a different diameter, in which the shaft portions 10, 13a, and 14a can be press fitted. The shaft hole 15c has the largest inner diameter, the shaft hole 15d has a larger inner diameter than that of the shaft hole 15e, and the shaft hole 15e has the smallest inner diameter. The press-fit widths of the shaft holes 15c, 15d, and 15e are set to be largest at the shaft hole 15d corresponding to the meshing shaft portion 10 and small at the shaft hole 15c corresponding to the straight body shaft portion 14a and the shaft hole 15e corresponding to the straight body shaft portion 13a. Regarding the lengths of the shaft holes 15c, 15d, and 15e, the shaft hole 15e is longer than the shaft hole 15d and the shaft hole 15c is shorter than the shaft hole 15d corresponding to the shaft lengths of the shaft portions 10, 13a, and 14a.

That is, this embodiment is characterized in that the dimensions of the shaft 5 and the shaft hole 15 are made gradually smaller towards the press-fit direction so as to obtain a smooth press-fit. Furthermore, one of the shaft portion and the shaft hole adjacent to the meshing shaft portion 10 and the shaft hole 15 where the press-fit width is largest, are made longer than the lengths of the shaft portion 10 and the shaft hole 15d, thereby to enhance the alignment when the shaft portion 10 is press fitted into the shaft hole 15d. In addition, the characteristic of rotation of the rotor 8 is improved by coaxially press fitting the shaft 5 with the rotor 8.

Furthermore, this embodiment is characterized in that the straight body shaft portion 15a which is press fitted last, has the largest diameter, and a cutting groove formed in a part of the inner peripheral surface of the shaft hole 15c before a press-fit of the straight body shaft portion 14a by means of press-fit of the meshing shaft portion 10 is collapsed, thereby to block a space between the peripheral surface of the straight body shaft portion 14a after the press-fit and the cut-groove so as to maintain the sealing performance around a compression chamber at the shaft 5.

In the above-described embodiments, the sectional configuration of the meshing projection 9 is comparable to an involute serration. However, the meshing projection 9 may have any other configuration as long as the projection is formed in the axial direction as a triangle tooth serration and a parallel cut knurling area.

In a press-fit structure of a shaft which is constructed in the manner as described above, for example, in the press-fit structure of a shaft according to the first embodiment, the structure is so simple as that a plurality of meshing projections 9 are machined on a predetermined place on the peripheral surface of the shaft 5 to form the meshing shaft portion 10, whereas a plurality of annular grooves 16 are formed at a predetermined place on the shaft hole 15 of the rotor 8. Regarding the annular groove 16, it may be integrally formed, for example, with the shaft hole 15 in order to save labor and to allow mass production.

Figure 4:
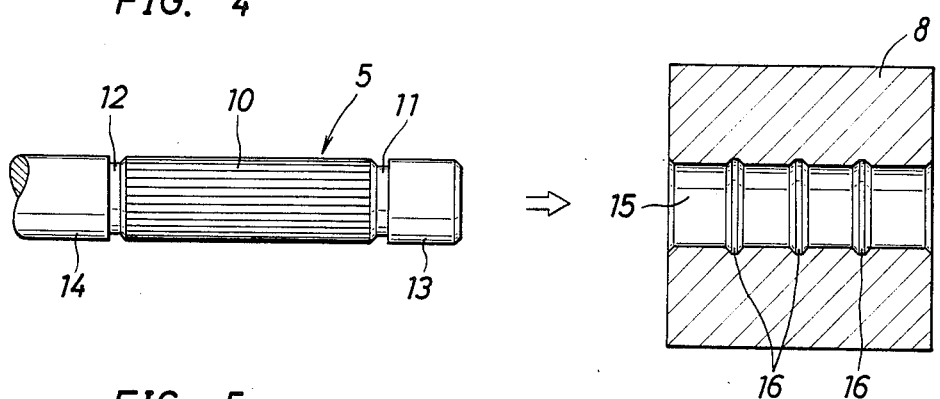
FIG. 4 is a front view of a shaft and a sectional view of a member to be fitted with the shaft according to one embodiment of the present invention.

And, in the case these are integrally secured together by using such shaft 5 and rotor 8, the rotor 8 is secured tight by a suitable means and the shaft 5 is positioned at a position coaxial with the shaft hole 15 by a pressure device. At that time, the straight body shaft portion 13 is held in such a fashion as that the portion having the small diameter is faced towards the shaft hole 15 as shown in FIG. 4.

In addition the interior of the shaft hole 15 of the rotor 8 is heated to approximately 150° to 200° C. by a suitable heating device to expand the inner diameter portion before or after the straight body shaft portion 13 is held facing towards the shaft hole 15, so that a press-fit load at the press-fit time will be small compared with that under an ordinary temperature.

Under such circumstances as mentioned, when the shaft 5 is pushed into the shaft hole 15 from the straight body shaft portion 13 side through the pressure device, the interior of the shaft hole 15 is push spread by the shaft portion 13, and the meshing shaft 10 having a somewhat large diameter is pushed into the shaft hole 15. At that time, since the shaft material is hard as compared with the rotor material, the inner peripheral surface of the shaft hole 15 is shaved in generally the same configuration as the sectional configuration of the projection 9 by the meshing projections 9 and each projection 9 advances into the interior of the shaft hole 15 along the shaved groove.

In this case, the press-fit fin shaved by the meshing projection 9 is scooped by the following projections so that the fin will not stay within the shaved groove and will be totally accommodated within the annular groove 16 formed in a front part in the press-fitting direction. Therefore, it is prevented that the press-fit fin stays within the shaved groove and bites into the shaved groove to substantially increase the press-fit width to induce a press-fit crack.

Moreover, by preventing the press-fit fin or shaving from staying within the shaved groove, the galling of the shaved groove and the meshing shaft portion 10 is prevented thereby to enhance a smooth press-fit. Accordingly, a small capacity of the pressure device is obtainable also assisted by heating the rotor 8.

In this way, when the meshing shaft portion 10 is press-fit into the shaft hole 15, the area around the press-fit portions of the shaft 5 and the rotor 8 exhibits a similar state to that where the meshing shaft portion 10 is in serration engagement within the shaft hole 15 as shown in FIG. 3. Accordingly, the slippage critical values of them become very large and a shaft torque can be surely transmitted to the rotor 8. Moreover, by making the tooth height of the meshing projection 9 low and increasing the number of the projections, the same can be applied to one for transmitting a high torque.

As described in the foregoing, a press-fit structure of a shaft according to the present invention comprises a shaft and a member to be fitted with the shaft formed with a shaft hole for receiving the shaft therein, the shaft being formed at a predetermined position of the peripheral surface thereof with a meshing shaft portion which is formed with a plurality of meshing projections in the axial direction. Accordingly, the engagement between the shaft and the member to be fitted with the shaft can be ensured with a simple structure. Moreover, by increasing the critical value of slippage of the shaft, torque can be surely transmitted to the member to be fitted with the shaft from the shaft. Particularly, this effect has the advantage in that even in the case the member to be fitted with the shaft is made of a material having a larger coefficient of thermal expansion than the shaft, a sure torque transmission can be performed overcoming the influence of the thermal expansion, thus suitable to the engagement between a rotor and a rotor shaft of a cooling medium compressor.

Furthermore, according to the present invention, a shaft hole of the member to be fitted with the shaft is formed in the inner peripheral surface with an annular groove for collecting a press-ft fin in order to totally accommodate the press-fit fin generated when the shaft is press fitted, so that the press-fit fin will not bite into the member to be fitted with the shaft. Accordingly, a substantial increase of the press-fit width due to biting of the fin can be prevented thereby to effectively prevent a press-fit crack from occurring. Thus, the structure of the invention can increase a reliability and a quality of this type of press-fit.

What is claimed is:

1. A press-fit structure of a shaft and a member having a shaft hole for fixedly receiving a shaft therein, said structure comprising:

a substantially cylindrical shaft having axially spaced apart leading, middle, and following portions, said leading and following portions being substantially plane and smooth, said middle portion being a meshing shaft portion having a plurality of axially extending meshing projections disposed on an outer surface thereof for cutting into an inner surface of a shaft hole of a member for cutting indentations therein and generating cut material therefrom for fixedly meshing said shaft with a shaft hole of a member when said shaft is press-fitted into a shaft hole thereof, said following portion having an outer diameter larger than an outer diameter of said middle meshing shaft portion, the diameter of said middle meshing shaft portion being larger than an outer diameter of said leading portion, an axial length of said leading portion being longer than an axial length of said meshing shaft portion and the axial length of said meshing shaft portion being longer than an axial length of said following portion for causing said meshing shaft portion to align coaxially with a shaft hole of a member when said shaft is press-fitted into a shaft hole thereof, and said shaft having first and second cut-grooves, said first cut-groove being between said leading portion and said meshing portion and having a diameter smaller than the diameter of said leading portion, said second cut-groove being between said meshing portion and said following portion and having a diameter smaller than the diameter of said meshing portion;

a member having a shaft hole for fixedly receiving said shaft therein, said shaft hole being substantially cylindrical and having axially spaced apart small auxiliary, main, and large auxiliary shaft hole sections, each one of said shaft hole sections being substantially plane and smooth, said large auxiliary shaft hole section having an inner diameter larger than an inner diameter of said main shaft hole section, the inner diameter of said main shaft hole section being larger than an inner diameter of said small auxiliary shaft hole section, the inner diameters of said small auxiliary, main, and large auxiliary shaft hole sections being sufficiently smaller than the said outer diameters of said leading, meshing, and following shaft portions, respectively, of said shaft for causing said shaft to be fixedly interference fitted with said shaft hole of said member when said shaft is press-fitted into said shaft hole, an axial length of said small auxiliary shaft hole section being substantially the same as the axial length of said leading shaft portion, an axial length of said main shaft hole section being substantially the same as the axial length of said meshing shaft portion, and an axial length of said large auxiliary shaft hole section being substantially the same as the axial length of said following shaft portion, and said shaft hole having first and second annular grooves, said first annular groove being between said small auxiliary shaft hole section and said main shaft hole section, said second annular groove being between said main shaft hole section and said large auxiliary shaft hole section, a diameter of each of said first and second annular grooves being larger than the diameter of said main shaft hole section, and an axial distance between said first and second annular grooves being substantially equal to the axial distance between said first and second cut-grooves for causing said first and second annular grooves to be respectively substantially aligned with said first and second cut-grooves when said shaft is press-fitted into said shaft hole, said first and second cut-grooves and said first and second annular grooves being collectively sufficiently large for collecting the cut material generated by said plurality of axially extending meshing projections on said meshing shaft portion cutting into the inner surface of said shaft hole of said member when said shaft is press-fitted into said shaft hole; and wherein, the axial lengths of said following, meshing, and leading shaft portions increase in the direction of press-fitting said shaft into said shaft hole of said member, and said following shaft portion is press-fitted into said large auxiliary shaft hole section of said shaft hole last for crushing any indentations cut into the inner surface of said large auxiliary shaft hole section by said plurality of axially extending meshing projections for tightly sealing said shaft hole.

2. A device as in claim 1, wherein said shaft is an iron-based material and said member is a material having a hardness less than the hardness of said iron-based material of said shaft.

3. A device as in claim 2, wherein said material of said shaft is carbon steel and said material of said member is a material selected from a group consisting of an aluminum alloy and aluminum.

* * * * *